United States Patent [19]

Mollard et al.

[11] 3,873,461

[45] Mar. 25, 1975

[54] METHOD OF PRODUCING SOLID SOLUTIONS OF MAGNETIC OXIDES

[75] Inventors: Paul Mollard, Murianette; Jacques Paris, Lyon; Abel Rousset, Caluire, all of France

[73] Assignee: Anvar-Agence Nationale de Valorisation de la Recherche, Courbevoire, France

[22] Filed: July 7, 1972

[21] Appl. No.: 269,838

[30] Foreign Application Priority Data
Apr. 21, 1972 France .................................. 72.14215

[52] U.S. Cl. ........................................... 252/62.56
[51] Int. Cl. ............................................. C04 35/32
[58] Field of Search ........ 252/62.55, 62.56; 423/634

[56] References Cited
UNITED STATES PATENTS

| | | | |
|---|---|---|---|
| 3,084,123 | 4/1963 | Hund | 252/62.56 |
| 3,117,933 | 1/1964 | Abeck et al. | 252/62.56 |
| 3,243,375 | 3/1966 | Jeschke | 252/62.56 |
| 3,278,440 | 10/1966 | Schuele | 252/62.56 |
| 3,288,563 | 11/1966 | Klomp et al. | 252/62.56 X |
| 3,317,574 | 5/1967 | Morita et al. | 252/62.56 X |
| 3,620,841 | 11/1971 | Comstock et al. | 252/62.56 X |
| 3,671,435 | 6/1972 | Hwang | 252/62.56 |

OTHER PUBLICATIONS

Robin– Thesis– Paris, 1953, Series A, No. 2613-3485.

*Primary Examiner*—Jack Cooper
*Attorney, Agent, or Firm*—Dowell & Dowell

[57] ABSTRACT

A solid solution of oxides of iron and of another divalent metal such as cobalt, more particularly for use in the manufacture of magnetic tapes and like magnetic carriers, is obtained first by preparing a mixed oxalate by co-precipitation of a solution of ammonium oxalate and of a solution containing $Fe^{3+}$ ions together with ions of the divalent metal, second by heating the mixed oxalate in air to decompose same while eliminating most of the carbon therefrom; third by heating the decomposed product in a wet hydrogen atmosphere to produce a substituted magnetic substantially free from residual carbon; and fourth by heating in air this substituted magnetite to oxidize same. The solid solution obtained corresponds to the formal $(\gamma\text{-}Fe_2O_3)_{1-y}(CoFe_2O_4)_y$ in which $y$ is comprised between zero and unity.

6 Claims, 5 Drawing Figures

METHOD OF PRODUCING SOLID SOLUTIONS OF MAGNETIC OXIDES

This invention relates to the preparation of solid solutions of oxides of iron or other divalent metals, such as cobalt, more particularly for the manufacture of magnetic recording tapes and like magnetic carriers.

It is known that iron sesquioxide may be found under two crystalline forms:

$\alpha$ - $Fe_2O_3$ which crystallizes according to the rhomboedric system;

$\gamma$ - $Fe_2O_3$ which crystallizes according to the spinel type cubic system.

Cubic iron sesquioxide has at ambient temperatures magnetic properties which may be used for the manufacture of magnetic recording tapes (C.D. MEE, The Physics of Magnetic Recording)

It is also known that an addition of cobalt ($Co^{2+}$) to this cubic oxide has some particular advantages:

- the coercitive field is increased;
- the magnetic shape anisotropy is replaced by a magneto-crystalline anisotropy;
- the dimensions of the crystallites are reduced, which improves the dispersion of the material on the tape.

At the present time magnetic materials comprised of cobalt doped iron sesquioxide are prepared by two methods, namely a wet process and a dry process.

In the wet process, as more particularly proposed by J. C. JECKE (U.S. Pat. No. 3,243,375) a solution containing sulphates of divalent iron and of another metal such as $Co^{2+}$, $Ni^{2+}$, $Cu^{2+}$ is precipitated by increasing its pH by an addition of thiosulphate. The coprecipitate is oxidized at 50° - 80°C. Potassium iodate $KIO_3$ is added to this oxidized product. The latter is washed and dried, it is thereafter reduced by carbon monoxide at temperatures comprised between 350° and 400°C, and it is finaly re-oxidized by being heated in air or in $CO_2$.

It is in fact quite difficult to obtain by this process a well-defined homogeneous product. During the precipitating and the oxidizing steps iron passes rapidly to the trivalent state, while cobalt, which is very unstable in the trivalent state, oxidizes much more slowly and incompletely. Reduction of such a mixture cannot lead to the obtention of a homogeneous substituted magnetite containing the initial quantity of cobalt. Furthermore the treatment by carbon monoxide alone has such a reducing effect that part of the oxides is transformed into metal, which of course increases the heterogeneous character of the magnetite. Subsequent oxidization cannot improve homogeneous substitution of cobalt for iron in the sesquioxide $\gamma$ - $Fe_2O_3$. Finally the magnetic properties obtained correspond to a quite small and heterogeneous doping in the sesquioxide. In addition to these disadvantages it should be noted that the product is poorly defined owing to the technic of the wet process, since the use of metallic hydroxides results in the presence of uncontrollable and sometimes important quantities of impurities which cannot be eliminated due to the relatively low operating temperatures (impurities of the type $OH^-$, $SO_4^{2+}$, $K^+$, $IO_3^-$, etc...)

The dry process, as proposed by ROBIN (thesis, Paris, 1953, series A, No. 2613-3485) consists in roasting a mixed oxalate of cobalt and divalent iron:

$(Fe_{1-x}Co_x) C_2O_4 \quad 0 < x < 0.33$ obtained by co-precipitation.

When decomposed in air between 300° and 500°C these oxalates lead to a mixture of rhomboedric sesquioxide $\alpha$ - $Fe_2O_3$ and of an oxide of spinel structure Co $Fe_2O_4$ which contains in the dissolved state a small proportion of cubic sesquioxide $\gamma$ - $Fe_2O_3$ (see ROBIN, pages 31 and 34).

But the product of this decomposition in air of mixed oxalates is all the more heterogeneous as the treating temperature is higher, as the treating time is longer for a given temperature (between 300° and 400°C) and as the sample contains more iron.

Finally the decomposition in air of a mixed oxalate results in a poorly defined and poorly organized product, which decomposes easily into a mixture of two different oxides $\alpha$ - $Fe_2O_3$ and Co $Fe_2 O_4$.

Whatever may be the process used, either wet or dry, it has been hitherto impossible to obtain a homogeneous and controlled substitution of a divalent metal such as cobalt, for $Fe^{3+}$ in $\gamma$ - $Fe_2O_3$.

More recent research, works (A. ROUSSET, French patent 69.06636; A. ROUSSET, thesis Lyon 1969; ROUSSET, PARIS, MOLLARD, GERMI, Annales de Chimie, 1972) have shown that such homogeneous substitutions of a trivalent element such a $Cr^{3+}$ for $Fe^{3+}$ were possible starting from a water soluble trioxalic mixed complex of the type:

$(NH_4)_3 [Fe_{1-x}Cr_x (C_2O_4)_3] \quad 0 < x < 1$ by operating in three steps, namely:

1° Obtaining finely crystallized solid solutions $\alpha$ - $(Fe_{1-x} Cr_x)_2 O_3$ by roasting in air up to at least 400°C mixed oxalic complexes of iron (III) and chromium (III).

2° Preparing trivalent-chromium substituted magnetites by treating these solid solutions $\alpha$ - $(Fe_{1-x} Cr_x)_2 O_3$ in an oxidoreducing atmosphere ($H_2$ containing 3 to 10 % $H_2O$) at temperatures comprised between 350° and 600°C according to the reaction:

$3\alpha$ - $(Fe_{1-x}Cr_x)_2 O_3 + H_2 \rightarrow 2[Fe^{2+}Fe_{2-y}^{3+}Cr_y^{3+}] O_4^{2-} + H_2O$ $y = 3x \quad o < y < 2$ 3° Oxidizing these magnetites by heat in the presence of air or oxygen at temperatures comprised between 250° and 400°C according to the reaction:

$2 [Fe^{2+}Fe_{2-y}^{3+} Cr_y^{3+}] O_4^{2-} + 1/2 O_2 \rightarrow 3y (Fe_{1-x}^{3+} Cr_x^{3+})_2 O_3^{2-}$ $y = 3x \quad 0 < x < 0.66$ However such a method cannot be used to obtain iron sesquioxide $\gamma$ - $Fe_2O_3$ substituted by divalent ions such as cobalt, for two main reason:

a. In the soluble trioxalic complex: $(NH_4)_3 [Fe (C_2O_4)_3]$ $Fe^{3+}$ ions cannot be substituted for by divalent ions;

b. Substitution of divalent ions for $Fe^{3+}$ ions in the rhomboedric sesquioxide $\alpha$ - $Fe_2O_3$ is also impossible.

It could be conceived at first sight that in the case of cobalt the method proposed by A. ROUSSET and al. might be possible due to the fact that this metal may have not only the valence + 2, but also + 3. But in fact two disadvantages resulting from the unstable character of trivalent cobalt do not permit practical application of this method:

A. the trioxalic complex $(NH_4)_3$ Co $(C_2O_4)_3$, which is particularly unstable at ambient temperatures, shows a marked tendency to decompose into a mixture of divalent cobalt oxalate $CoC_2O_4$, of ammonium oxalate $(NH_4)_2C_2O_4$ and of oxalic acid $H_2C_2O_4$;

B. no substitution of trivalent cobalt for trivalent iron in the rhomboedric sesquioxide $\alpha$ - $Fe_2O_3$ has hitherto been possible.

It is an object of the present invention to avoid these disadvantages and to provide a method for the homogeneous and controlled substitution of divalent metallic ions other than iron, and more particularly of $Co^{2+}$ for $Fe^{3+}$ in $\alpha$ - $Fe_2O_3$.

The invention further includes the products obtained by means of such a substitution.

The method according to the present invention comprises three different successive steps:

First step -

A water-insoluble mixed oxalate is prepared by co-precipitating by means of a solution of ammonium oxalate, a solution containing in addition to $Fe^{2+}$ ions, another divalent metallic ion such as $Co^{2+}$. The precipitate:

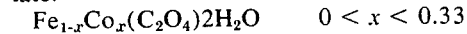
$Fe_{1-x}Co_x(C_2O_4)2H_2O \qquad 0 < x < 0.33$ is thereafter washed and dried.

Second step -

This oxalate is decomposed by being heated (pyrolysis) in the presence of air with a thermal gradient of 150°C per hour up to a temperature comprised between 210° and 300°C. The treating temperature to be selected should be increased as the percentage of divalent ions is higher. This operation, the main object of which is to eliminate carbon, requires two essential conditions.

- the treatment should be effected on thin layers to avoid local overheatings and to facilitate elimination of carbon;
- it is important to stop the heating operation once the desired temperature is reached, since the residue is then formed of a mixture of rhomboedric oxide $\alpha$ - ($Fe_2O_3$) and of spinel oxide $M^{2+}Fe_2O_4$ ($M^{2+}$ designating the divalent metal such as cobalt).

The product obtained at this step corresponds to a combination between iron and the divalent metal such as cobalt, this combination being finely crystallized in a network of cubic symmetry, as this is demonstrated by the wide lines which appear in the X-ray diffraction spectrum and which may attributed to the spinel spectrum. This still poorly organized combination decomposes into sesquioxide $\alpha$ - $Fe_2O_3$ and oxide $MFe_2O_4$ at a rate which varies with temperature.

Third step -

The third operating step consists in orientating the crystallization of the combination towards a cubic network of the spinel type, namely that of the magnetite substituted by the divalent metal such as cobalt, the general formula being:

$[Fe_{1-y}^{2+}Co_y^{2+}Fe_2^{3+}] O_4^{2-} \qquad 0 < y < 1$

For this purpose the product is treated for 7 hours at 260°C in a stream of hydrogen (6 litres per hour) containing 7 percent in volume of steam. The solid thus obtained corresponds to the desired cobalt substituted magnetite and it is formed of crystallites the dimension of which varies between 470 A (for $y = 0$) and 250 A (for $y = 0.876$).

By decreasing the treating temperatures it has even been possible to obtain crystallites the dimension of which was comprised between 100 A and the preceding values.

It should be noted that it is on the contrary possible to increase the dimension of the crystallites by appropriate heat treatments. For instance heating for 24 hours at temperatures ranging between 280° and 450°C under quite low pressure ($10^{-5}$ mm Hg) permits of obtaining cobalt substituted magnetites in which the dimension of the crystallites varies between 1000 A and 400 A.

An important advantage of the treatment by wet hydrogen is the elimination of carbon, the percentage thereof in the solids obtained being lower than 0.2 percent.

Fourth step -

It consists in oxidizing the substituted magnetite to cause the whole of iron to assume the trivalent state. In the case of cobalt the reaction is:

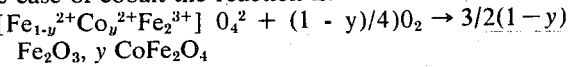
$[Fe_{1-y}^{2+}Co_y^{2+}Fe_2^{3+}] O_4^2 + (1 - y)/4)O_2 \rightarrow 3/2(1-y) Fe_2O_3, y\ CoFe_2O_4$
$y = 3x \qquad 0 < y < 1$ This is effected by treating the substituted magnetites in air for 72 hours at temperatures comprised between 210°C (for $y = 0$) and 380°C (for $y = 0.876$).

The method according to this invention finally permits of obtaining a homogeneous substitution of a divalent metal, such as $Co^{2+}$, for iron in the iron sesquioxide $\gamma$ - $Fe_2O_3$, i. e. of forming the following solid solutions:

$\gamma$ - $(Fe_2O_3)_{1-y}(CoFe_2O_4)_y \qquad 0 < y < 1$

The main characteristics of the products obtained by this process will be indicated below and a number of examples will be given for a better understanding of the invention, with reference to the annexed drawings in which.

The characteristics of the products obtained by the method of the invention are as follows:

I - Chemical characteristics

The solid solutions between cubic iron sesquioxide and ferrites of divalent metals, such as cobalt, possess satisfactory definition and homogeneity.

Their chemical composition is defined beyond 1 percent. The carbon percentage is reduced below 0.2 percent by the above-mentioned treatment and these products contain no percentage of $Fe^{2+}$ and $Co^{3+}$ which may be detected by usual processes.

Figure 1:
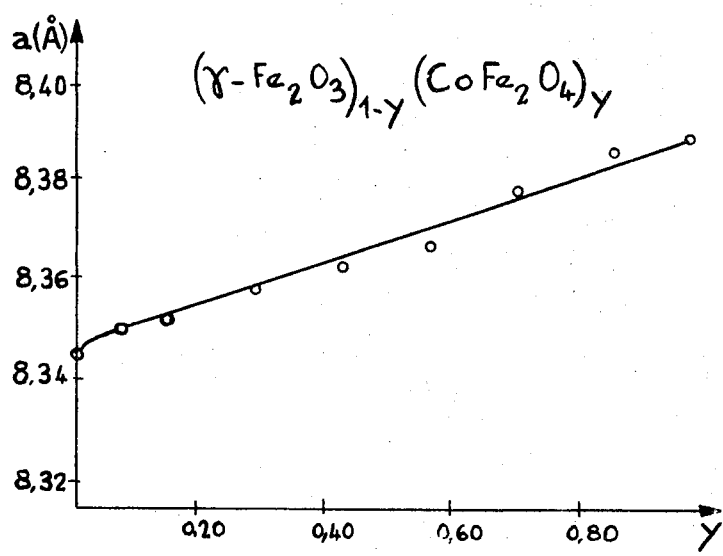
FIG. 1 is a diagram showing the relation between the crystalline parameter of the products obtained and their percentage of the divalent metal, namely cobalt.

The crystalline parameter of these solid solutions varies between that of $\gamma$ - $Fe_2O_3$ and that of the ferrite $CoFe_2O_4$, as indicated by the curve of FIG. 1.

Figure 2:
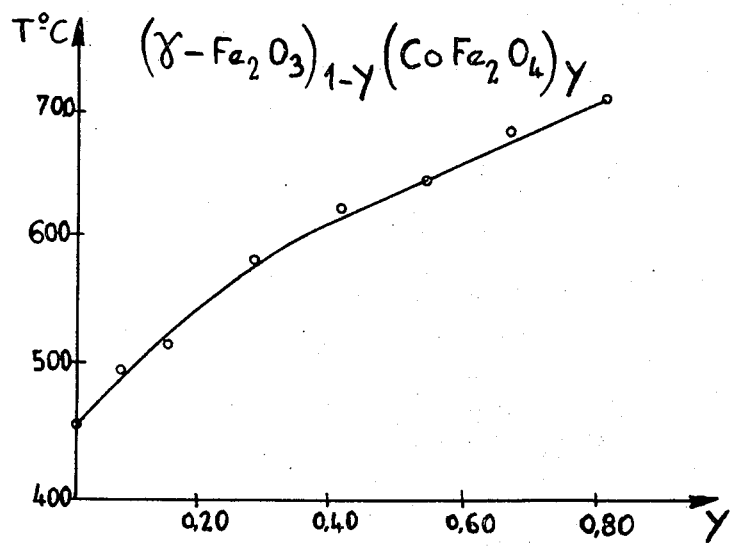
FIG. 2 illustrates in the same manner the relation between the temperature of the $\gamma \rightarrow \alpha$ transformation and the percentage of cobalt.

As to the thermic stability, it increases regularly with the percentage of divalent elements, such as cobalt, as it results from FIG. 2.

II - Morphologic characteristics

The morphology of the products obtained, as determined by means of electronic microscope, has the main characteristics below:
- The spherical elementary grains are the crystallites themselves the dimension of which may vary between 100 and 1000 A;
- the granulometric distribution is quite narrow.

Figure 3:
FIG. 3 is an electronic microscope view showing a solid solution obtained according to the invention.

FIG. 3 shows, as seen in the electronic microscope (magnifying power 100,000), the solid solution:

$$(\gamma - Fe_2O_3)_{0.928}(CoFe_2O_4)_{0.072}$$

obtained by treating the oxalate:

$$(Fe_{0.976}Co_{0.024}) C_2O_4$$

in accordance with the present invention. This view illustrates the regularity of the grains.

III - Magnetic characteristics

Figure 4:
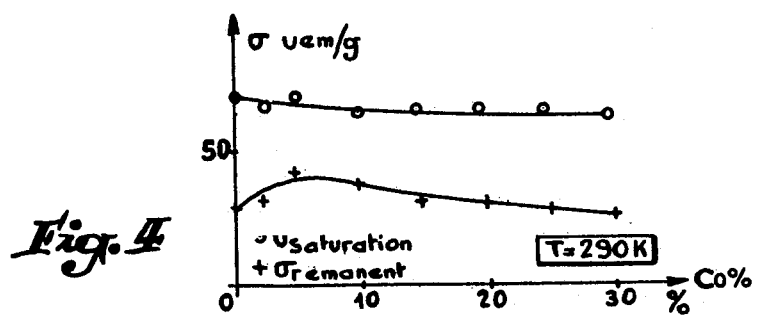
FIG. 4 is a diagram illustrating the variations of the saturation and remanent magnetizations with the cobalt percentage in a product according to the invention.

The products or solid solutions according to the invention have a saturation magnetization and a remanent magnetization which vary with the percentage of cobalt at ambient temperature, as indicated by the curves of FIG. 4.

As already indicated under II, the spherical elementary grains, which are the crystallites themselves, correspond to magnetic monodomains.

The narrow granulometric distribution of these monodomain crystallites eliminates the undesirable effects which appear with a wider distribution comprising finer particles in the superparamagnetic state, or bigger particles divided into more than one magnetic domain, or still further particles having a non uniform magnetization.

The following examples are given for a better understanding of the invention.

EXAMPLE I

The cubic solid solution to be obtained is:

$$(\gamma - Fe_2O_3)_{0.928} (CoFe_2O_4)_{0.072}$$

The first step is to prepare the mixed oxalate:

$$(Fe_{0.976}Co_{0.024}) C_2O_4, 2H_2O$$

This oxalate precipitates when a solution containing appropriate proportions of Mohr salt and of cobalt chloride is treated by a slight excess of ammonium oxalate. The precipitate is washed in distilled water, dried at ambient temperature and then decomposed by being heated in air at 250°C, with a temperature gradient of 150°C/h. The residue of this pyrolysis is thereafter treated during 7 hours at 260°C in a hydrogen atmosphere containing 7 percent in volume of steam, which permits of obtaining the cobalt substituted magnetite:

$$(Fe_2^{3+}Fe_{0.928}^{2+}Co_{0.072}^{2+}) O_4^{2-}$$

in the form of crystallites having a dimension of 350 A.

This substituted magnetite is oxidized by being heated with a temperature gradient of 150°C/h up to 280°C at which temperature it is maintained for 72 hours. There is thus obtained the following cubic solid solution of spinel type:

$$(\gamma - Fe_2O_3)_{0.928} (CoFe_2O_4)_{0.072}$$

the caracteristics of which are as follows:
- Crystalline parameter: $a = 8.351$ A
- Average dimension of the substantially spherical crystallites: $D = 370$ A
- Transformation temperature: $T_f = 500°C$
- Saturation magnetization at 290 K: $\sigma s = 69$ e.m.u./g
- Remanent magnetization at 290 K: $\sigma r = 32$ e.m.u./g
- Coercive field at 290 K: $H_c = 300$ Oe

EXAMPLE II

In this example it has been attempted to obtain the same solid solution as in the preceding axample, but by the known processes.

The first step is here again to prepare the mixed oxalate $(Fe_{0.976}Co_{0.024}) C_2O_4, 2H_2O$ as in example I, but this product is decomposed in air by being heated with a temperature gradient of 150°/h up to 280°C at which it is maintained for 72 hours. Examination by X-rays and by electronic microscopy demonstrates that the product obtained is in no way the spinel type cubic solid solution expected, but a mixture of rhomboedric iron sesquioxide $\gamma - Fe_2O_3$ and of cobalt ferrite $CoFe_2O_4$.

Figure 5:
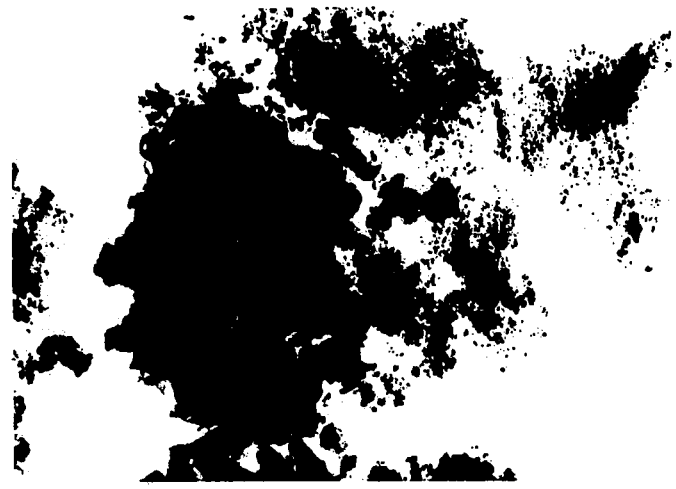
FIG. 5 is an electronic microscope view showing a product obtained by methods of the prior art.

The electronic microscope view of FIG. 5 does not correspond to exactly the same mixed oxalate as above. But is shows clearly what is in fact obtained by the pyrolysis in air of an oxalate of the kind in question. The oxalate which corresponds to this view is $Fe_{0.903}Co_{0.097}C_2O_4$ after treatment at 280°C for 72 hours. The magnifying power is here again 100,000. The irregularity of the texture is particularly visible.

EXAMPLE III

In order to obtain the cubic solid solution:

$$(\gamma - Fe_2O_3)_{0.556}(CoFe_2O_4)_{0.435}$$

the mixed oxalate $(Fe_{0.855}Co_{0.145})C_2O_4, 2H_2O$ is first prepared as indicated in example I. It is then decomposed in air by being heated up to 300°C with a temperature gradient of 150°C/h. The residue of this pyrolysis is treated for 7 hours at 260°C in a hydrogen atmosphere containing 7 percent in volume of steam. There is thus obtained the cobalt substituted magnetite:

$$(Fe_2^{3+}Fe_{0.565}^{2+}Co_{0.435}^{2+}) O_4^{2-}$$

in the form of crystallites of 300 A

This magnetite is oxidized in air by being heated at 320°C for 72 hours with a temperature gradient of 150°C/h. The result is the spinel type cubic solution:

$$(\gamma - Fe_2O_3)_{0.565}(CoFe_2O_4)_{0.435}$$

the characteristics of which are as follows:
- Crystalline parameter: $a = 8.363$ A
- Average dimension of the substantially spherical crystallites: $D = 310$ A
- Transformation temperature $T_f = 620°C$
- Saturation magnetization at 290 K: $\sigma s = 66$ e.m.u./g
- Remanent magnetization at 290 K: $\sigma r = 33$ e.m.u./g
- Coercive field at 290 K: $H_c = 760$ Oe

EXAMPLE IV

It is desired to obtain the cubic solid solution of example III, i.e. $(\gamma - Fe_2O_3)_{0.565} (CoFe_2O_4)_{0.435}$ but with crystallites of larger dimensions.

For this purpose there is first prepared the cobalt substituted magnetite $(Fe_2^{3+}Fe_{0.565}^{2+}Co_{0.435}^{2+}) O_4^2$ with crystallites of 300 A as explained concerning example III. But before submitting this magnetite to the oxidizing step, it is maintained during 24 hours under a vacuum of $10^{-5}$ mmHg, after which it is heated at 400°C for 24 hours under this same vacuum. Under such conditions the magnetite becomes formed of crystallites of 650 A. It is thereafter oxidized for 72 hours as in Example III. The product obtained is still the solid solution $(\gamma - Fe_2O_3)_{0.565}(CoFe_2O_4)_{0.435}$ but the characteristics are now as follows:

- Crystalline parameter: $a = 8.365$ A
- Average dimension of the substantially spherical crystallites: $D = 700$ A
- Transformation temperature in temperature increasing regime: $T_f = 570°C$
- Saturation magnetization at 290 K: $\sigma s = 65$ e.m.u./g
- Remanent magnetization at 290 K: $\sigma r = 43$ e.m.u./g
- Coercitive field at 290 K: $H_c = 2100$ Oe

EXAMPLE V

The cubic solid solution to be obtained is:

$$(\gamma - Fe_2O_3)_{0.124} (CoFe_2O_4)_{0.876}$$

The mixed oxalate $(Fe_{0.708}Co_{0.292})C_2O_4, 2H_2O$ is first prepared in the manner indicated for example I. It is decomposed by being heated in air at 300°C with a temperature gradient of 150°C/h. The residue is submitted during 7 hours at 260°C to the action of a hydrogen atmosphere containing 7 percent in volume of steam so as to obtain the cobalt substituted magnetite $(Fe_2^{3+}Fe_{0.124}^{2+}Co_{0.876}^{2+}) O_4^{2-}$ in the form of crystallites having an average dimension of 250 A. This substituted magnetite is thereafter oxidized in air by being heated with a temperature gradient of 150°C/h up to 380°C at which it is maintained for 72 hours. The product is the spinel type cubic solid solution $(\gamma - Fe_2O_3)_{0.124} (CoFe_2O_4)_{0.876}$ the characteristics of which are:

- Crystalline parameter: $a = 8.383$ A
- Average dimension of the substantially spherical crystallites: $D = 250$ A
- Transformation temperature: $T_f = 710°C$
- Saturation magnetization at 290 K: $\sigma s = 65$ e.m.u./g
- Remanent magnetization at 290 K: $\sigma r = 29$ e.m.u./g
- Coercive field at 290 K: $H_c = 1840$ Oe

We claim:

1. A method for the preparation of solid solutions of iron and cobalt of the type $(\gamma - Fe_2O_3)_{1-y} (CoFe_2O_4)_y$ with $0 < y < 0.876$ by homogeneous and controlled substitution of divalent cobalt ions for $Fe^{3+}$ ions in $\gamma - Fe_2O_3$, comprising the following steps:

a. preparing by co-precipitation a water insoluble mixed oxalate containing $Fe^{2+}$ ions and divalent cobalt ions, said mixed oxalate corresponding to the formula: $Fe_{1-x}Co_x(C_2O_4) 2H_2O$ wherein the value of $x$ is such that the ratio of cobalt to iron in said oxalate is the same as the ratio of cobalt to iron in said solid solution;

b. heating uniformly said mixed oxalate in air at a progressively increasing temperature in the range of 210°C to 300°C until it is decomposed and most of the resultant carbon is eliminated, said heating step being stopped before any formation of rhomboedric oxide $\alpha - Fe_2O_3$ and of spinel oxide $CoFe_2O_4$;

c. heating the product of step b) in a wet hydrogen atmosphere containing about 7 percent by volume of steam at such a temperature as to produce a substituted magnetite formed of crystallites and substantially free from residual carbon;

d. and heating in air said substituted magnetite to a temperature such as to oxidize same, said temperature being between about 210°C and 380°C and increasing in direct proportion to the value of $y$.

2. In a method as claimed in claim 1, said water-insoluble mixed oxalate being heated during said second step with a temperature gradient of substantially 150°C per hour.

3. In a method as claimed in claim 2, said mixed oxalate being heated in the form of a thin layer.

4. In a method as claimed in claim 1, the product of step (b) being heated during step (c) at a temperature of substantially 260°C in said hydrogen atmosphere containing substantially 7 percent steam by volume.

5. In a method as claimed in claim 1, prior to step d, heating said substituted magnetite formed in step c under vacuum at a temperature between 280° and 450°C to increase the dimension of said crystallites before submitting said magnetite to step d.

6. In a method as claimed in claim 1, said substituted magnetite being heated during step d. for substantially 72 hours.

* * * * *